US010674564B2

(12) United States Patent
Hapsari et al.

(10) Patent No.: US 10,674,564 B2
(45) Date of Patent: Jun. 2, 2020

(54) BASE STATION, MANAGEMENT APPARATUS AND CONNECTION METHOD

(71) Applicant: NTT DOCOMO, INC., Tokyo (JP)

(72) Inventors: Wuri Andarmawanti Hapsari, Tokyo (JP); Yasuhiro Kawabe, Tokyo (JP); Masaaki Ohtake, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/891,217

(22) Filed: Feb. 7, 2018

(65) Prior Publication Data

US 2018/0167999 A1 Jun. 14, 2018

Related U.S. Application Data

(63) Continuation of application No. PCT/JP2016/073651, filed on Aug. 10, 2016.

(30) Foreign Application Priority Data

Aug. 13, 2015 (JP) .................... 2015-159996

(51) Int. Cl.
*H04W 4/00* (2018.01)
*H04W 92/14* (2009.01)
(Continued)

(52) U.S. Cl.
CPC .............. *H04W 92/14* (2013.01); *H04W 8/02* (2013.01); *H04W 48/02* (2013.01); *H04W 88/18* (2013.01); *H04W 88/182* (2013.01)

(58) Field of Classification Search
CPC ....... H04W 92/14; H04W 48/02; H04W 8/02; H04W 88/18; H04W 88/182
See application file for complete search history.

(56) References Cited

U.S. PATENT DOCUMENTS 9,674,749 B2 * 6/2017 Jeong ................. H04W 36/14
9,930,611 B2 * 3/2018 Qi ........................ H04W 48/14
(Continued)

FOREIGN PATENT DOCUMENTS

JP 2015050759 A 3/2015
WO 2015002290 A1 1/2015

OTHER PUBLICATIONS

Extended European Search Report issued in the counterpart European Patent Application No. 16835228.4, dated Jul. 16, 2018 (9 pages).

(Continued)

*Primary Examiner* — Phuc H Tran
(74) *Attorney, Agent, or Firm* — Osha Liange LLP

(57) ABSTRACT

A base station includes a transceiver and a processor. The processor is configured to: in response to receiving a connection request from user equipment, causes a transceiver to transmit a message to a first management apparatus; and in response to receiving a reroute message to indicate a reroute from a first management apparatus to a second management apparatus, causes the transceiver to transmit Non Access Stratum (NAS) information in the reroute message to the second management apparatus. The message includes an identifier of the user equipment assigned by the base station. The base station is configured to perform a connection operation on the user equipment. The identifier of the user equipment assigned by the base station is configured in the reroute message without provision of an identifier of the user equipment assigned by the first management apparatus.

7 Claims, 11 Drawing Sheets

(51) Int. Cl.
*H04W 88/18* (2009.01)
*H04W 8/02* (2009.01)
*H04W 48/02* (2009.01)

(56) References Cited

U.S. PATENT DOCUMENTS

| | | | | |
|---|---|---|---|---|
| 9,955,393 | B2* | 4/2018 | Watfa | H04W 36/0055 |
| 10,136,407 | B2* | 11/2018 | Kuge | H04W 60/04 |
| 10,159,099 | B2* | 12/2018 | Lim | H04W 8/065 |
| 2016/0174120 | A1* | 6/2016 | Zembutsu | H04W 36/0005 370/331 |
| 2017/0078867 | A1* | 3/2017 | Ianev | H04W 8/065 |

OTHER PUBLICATIONS

NTT Docomo, Inc.; "Clarification on Dedicated Core Network (DECOR) open issues"; 3GPP TSG-RAN3#89bis R3-152191; Sophia Antipolis, France, Oct. 5-9, 2015 (8 pages).

Ericsson; "UE and CN Synchronization in Dedicated Core Networks"; SA WG2 Meeting #107 S2-150078; Sorrento, Italy, Jan. 26-30, 2015 (4 pages).

Ericsson; "Redirection at UE Initiated Initial Access"; SA WG2 Meeting #107 S2-150079; Sorrento, Italy, Jan. 26-30, 2015 (7 pages).

International Search Report issued in the corresponding International Application No. PCT/JP2016/073651, dated Nov. 1, 2016 (5 pages).

Written Opinion issued in the corresponding International Application No. PCT/JP2016/073651, dated Nov. 1, 2016 (3 pages).

Office Action issued in the counterpart Japanese Patent Application No. 2015-159996, dated Oct. 25, 2016 (5 pages).

3GPP TS 23.401 V13.3.0; "3rd Generation Partnership Project; Technical Specification Group Services and System Aspects; General Packet Radio Service (GPRS) enhancements for Evolved Universal Terrestrial Radio Access Network (E-UTRAN) access (Release 13)"; Jun. 2015 (324 pages).

3GPP TS 36.413 V13.0.0; "3rd Generation Partnership Project; Technical Specification Group Radio Access Network; Evolved Universal Terrestrial Radio Access Network (E-UTRAN); S1 Application Protocol (S1AP) (Release 13)"; Jun. 2015 (302 pages).

* cited by examiner

RELATED ART

FIG.8

9.1.7.x  NAS MESSAGE REROUTE

This message is sent by the MME and is used to indicate to eNB that NAS information needs to be rerouted to another MME.

Direction: MME → eNB

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| MMEGI | M | | 9.x.x.x. | | YES | ignore |
| NAS-PDU | M | | 9.2.3.5 | | YES | reject | or

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| MME UE S1AP ID | O | | 9.2.3.x | | YES | ignore |
| MMEGI | M | | 9.x.x.x. | | YES | ignore |
| NAS-PDU | M | | 9.2.3.5 | | YES | reject |

BASE STATION, MANAGEMENT APPARATUS AND CONNECTION METHOD

CROSS-REFERENCE TO RELATED APPLICATIONS

This application is a continuation application of PCT/JP2016/073651, filed on Aug. 10, 2016, which claims priority to Japanese Patent Application No. 2015-159996, filed on Aug. 13, 2015. The contents of these applications are incorporated by reference in their entirety.

TECHNICAL FIELD

One or more embodiments disclosed herein relate to a radio communication system.

BACKGROUND

It is envisaged that not only mobile phones and smartphones but also various things may be connected to the Internet in the future. Various techniques for implementing the Internet of Things (IOT) are presently discussed. As one of these techniques, Dedicated Core Network (DECOR) has been discussed in Rel-13 of Long Term Evolution (LTE) as a control technique for separating general users such as mobile phones and smartphones from Machine-to-Machine (M2M) users such as smart meters and sensors and accommodating respective user equipments in different core networks (CNs) corresponding to device types and/or subscription types.

As illustrated in FIG. 1, in addition to an existing Evolved Packet Core (EPC), an M2M dedicated EPC for M2M users is provided in the DECOR. Upon visiting a base station (evolved NodeB: eNB), user equipment (UE) transmits an Attach/Tracking Area Update (TAU) to the base station. Upon receiving the Attach/TAU, the base station transmits the Attach/TAU to an existing EPC serving as a default CN. Upon receiving the Attach/TAU, the existing EPC transmits an Updated Location Request (ULR) to an IP Service Control Point (IPSCP) or a Home Subscriber Server (HSS). The IPSCP or the HSS returns an Update Location Answer (ULA) to indicate subscription information (user information, an Access Point Name (APN), a UE Usage Type (UE type), or the like) on the user equipment to the existing EPC. The existing EPC determines the UE type from the received subscription information and redirects the Attach/TAU corresponding to the determined UE type. Specifically, the existing EPC determines whether the user equipment is the general user or the M2M user based on the UE type. If the UE type is the general user, the existing EPC accommodates the user equipment. On the other hand, if the UE type is the M2M user, the existing EPC redirects the Attach/TAU to an M2M dedicated EPC (e.g., dedicated CN). In this manner, according to the DECOR, even if lower prioritized M2M terminals are congested, the M2M users are accommodated by the M2M dedicated EPC, which can avoid influence on the general users. Besides, since there are cases where a network function to accommodate the M2M terminals differs from a network function to accommodate the general users, according to the DECOR, the M2M terminals can be allocated to resources for the dedicated core network, and there are some merits where functions and/or resources to be possessed by the dedicated core network can be efficiently introduced.

In the DECOR, a base station redirects a Non Access Stratum (NAS) message to an M2M dedicated EPC based on Dedicated Mobility Management Entity Group Identity (MMEGI). Here, in a conventional CN selection control function where the DECOR is not applied (NAS Node Selection Function: NNSF), upon receiving a connection request from user equipment, the base station selects a Mobility Management Entity (MME) for the user equipment. Specifically, if the user equipment is connecting by an Initial Attach, the base station uses a Globally Unique MME Identity (GUNMEI) or a Selected Public Land Mobile Network (PLMN) included in an RRC Connection Setup Complete to select one MME from MMEs in the relevant network (e.g., PLMN) randomly. On the other hand, if the user equipment is connecting by a Service Request (e.g., restoration from a Preservation state) or a TAU, the base station uses a SAE Temporary Mobile Subscriber Identity (S-TMSI) included in an RRC Connection Request to restore the connection to the relevant MME.

Specifically, in the case where the user equipment attempts the connection by the Service Request or the TAU, as illustrated in FIG. 2, the user equipment first transmits an RRC Connection Request including the S-TMSI to the base station. After returning an RRC Connection Setup, the base station receives an RRC Connection Setup Complete including a Registered MME and a Selected PLMN from the user equipment. Upon receiving the RRC Connection Setup Complete, the base station performs the NNSF and transmits an Initial UE Message to MME #1 corresponding to the Registered MME. Upon receiving the Initial UE Message, the MME #1 exchanges an Initial Context Setup Request or an Initial Context Setup Response with the base station, and an S1 Connection for the relevant UE will be established between the base station and the MME #1.

SUMMARY

One or more embodiments disclosed herein provide techniques for establishing connection to the reroute destination MME without setting any unnecessary identifier.

According to one aspect, embodiments disclosed herein include a base station with a transceiver and a processor. The processor is configured to: in response to receiving a connection request from a user equipment, cause the transceiver to transmit a message to a first management apparatus, and in response to receiving a reroute message to indicate a reroute from a first management apparatus to a second management apparatus, cause the transceiver to transmit Non Access Stratum (NAS) information in the reroute message to the second management apparatus. The message includes an identifier of the user equipment assigned by the base station. The base station is configured to perform a connection operation on the user equipment. The identifier of the user equipment assigned by the base station is configured in the reroute message without provision of an identifier of the user equipment assigned by the first management apparatus.

In one aspect, the first management apparatus has a default Mobility Management Entity (MME) in a Dedicated Core Network (DECOR), the second management apparatus has a Machine-to-Machine (M2M) dedicated MME in the DECOR, and the reroute message includes instructions for the base station to reroute the user equipment from the default MME to the M2M dedicated MME.

In one aspect, the core network connection unit establishes the S1 connection for the second management apparatus and the user equipment based on the identifier of the user equipment assigned by the base station and an identifier of the user equipment assigned by the second management apparatus.

In one aspect, the processor performs a core node selection function to select the first management apparatus as a management apparatus to accommodate the user equipment, and the first management apparatus is selected based on the connection request received from the user equipment.

In another aspect, embodiments disclosed herein include a management apparatus with a transceiver and a processor. The processor is configured to: in response to receiving a connection request of a user equipment from a base station, determine a type of the user equipment, perform a reroute operation to accommodate the user equipment in another management apparatus corresponding to the type of the user equipment, and cause a transceiver to transmit a reroute message to the base station. The reroute message includes Non Access Stratum (NAS) information for connecting to the other management apparatus, and an identifier of the user equipment assigned by the base station is configured in the reroute message without provision of an identifier of the user equipment assigned by the management apparatus.

In one aspect, the management apparatus has a default Mobility Management Entity (MME) in a Dedicated Core Network (DECOR), the another management apparatus has a Machine-to-Machine (M2M) dedicated MME in the DECOR, and the reroute message includes instructions for the base station to reroute the user equipment from the default MME to the M2M dedicated MME.

In one aspect, the identifier of the user equipment assigned by the management apparatus is not configured in the reroute message.

In another aspect, embodiments disclosed herein include a connection method for connecting a user equipment to a core network. The method includes the steps of: receiving, by a base station, a connection request from the user equipment; selecting, by the base station, a first management apparatus to accommodate the user equipment based on the received connection request; transmitting, by the base station, the connection request for the user equipment to the first management apparatus; determining, by the first management apparatus, a type of the user equipment; and performing, by the first management apparatus, a reroute operation to accommodate the user equipment in a second management apparatus. The second management apparatus corresponds to the type of the user equipment. Performing the reroute operation includes transmitting a reroute message to the base station. The reroute message includes Non Access Stratum (NAS) information for connecting to the second management apparatus and an identifier of the user equipment assigned by the base station is configured in the reroute message without provision of an identifier of the user equipment assigned by the first management apparatus.

According to one or more embodiments disclosed herein, it is possible to establish connection to the reroute destination MME without setting any unnecessary identifier.

BRIEF DESCRIPTION OF DRAWINGS

FIG. 8 is a diagram for illustrating an information element NAS MESSAGE REROUTE according to one or more embodiments.

DETAILED DESCRIPTION

One or more embodiments disclosed herein will now be described for exemplary purposes with reference to the drawings.

Figure 1:
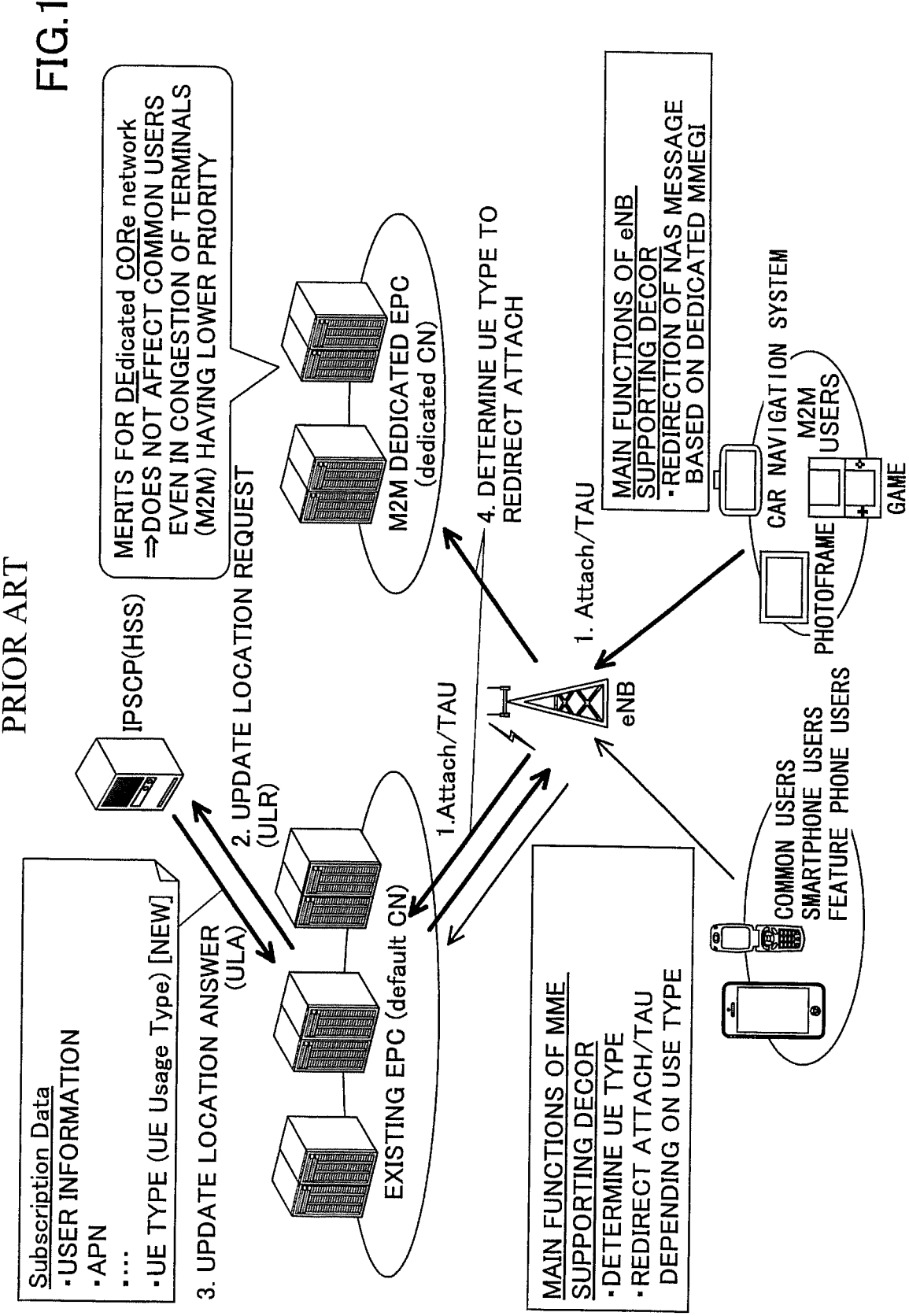
FIG. 1 is a schematic diagram for illustrating the DECOR.
Figure 2:
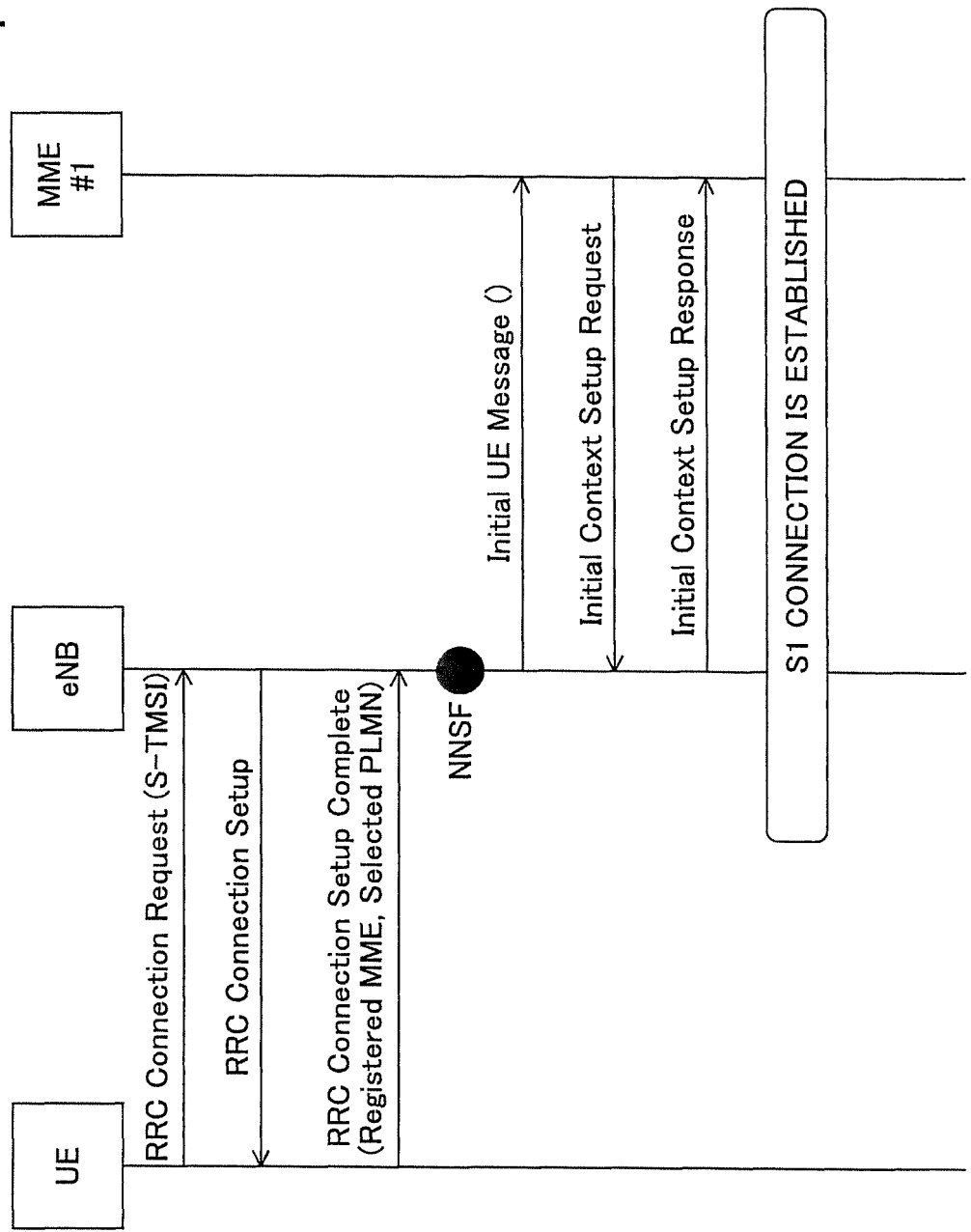
FIG. 2 is a sequence diagram for illustrating an NNSF procedure.
Figure 3:
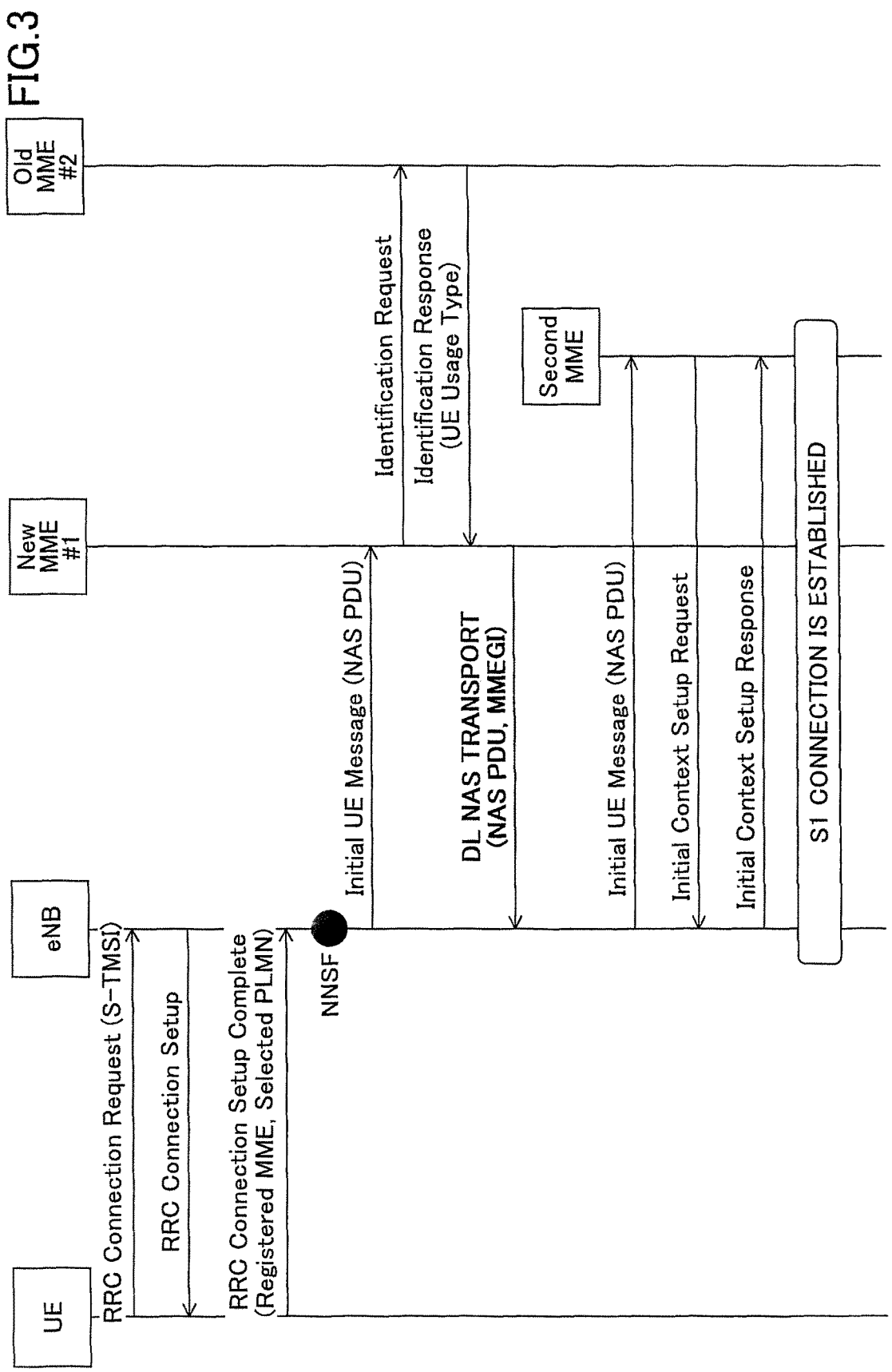
FIG. 3 is a sequence diagram for illustrating a DECOR applied NNSF procedure.

Considering the above-stated NNSF, it can be considered that the DECOR applied NNSF may follow a procedure as illustrated in FIG. 3. Specifically, similar to the procedure in FIG. 2, upon receiving an RRC Connection Setup Complete from the user equipment, the base station transmits an Initial UE Message including a NAS PDU to the MME #1. Upon receiving the Initial UE Message, the MME #1 transmits an Identification Request to MME #2 interacting with the user equipment in a previous session. Upon receiving the Identification Request, the MME #2 returns an Identification Response including an UE Usage Type of the user equipment. Assuming that the UE type is the M2M user, the MME #1 transmits a Downlink (DL) NAS TRANSPORT including a NAS PDU (Packet Data Unit) and an MMEGI to the base station to redirect the user equipment to the M2M MME. Upon receiving the DL NAS TRANSPORT, the base station transmits an Initial UE Message to the M2M MME corresponding to the MMEGI and exchanges the Initial Context Setup Request and the Initial Context Setup Response with the M2M MME. As a result, the S1 Connection for the relevant UE is established between the base station and the M2M MME.

Figure 4:
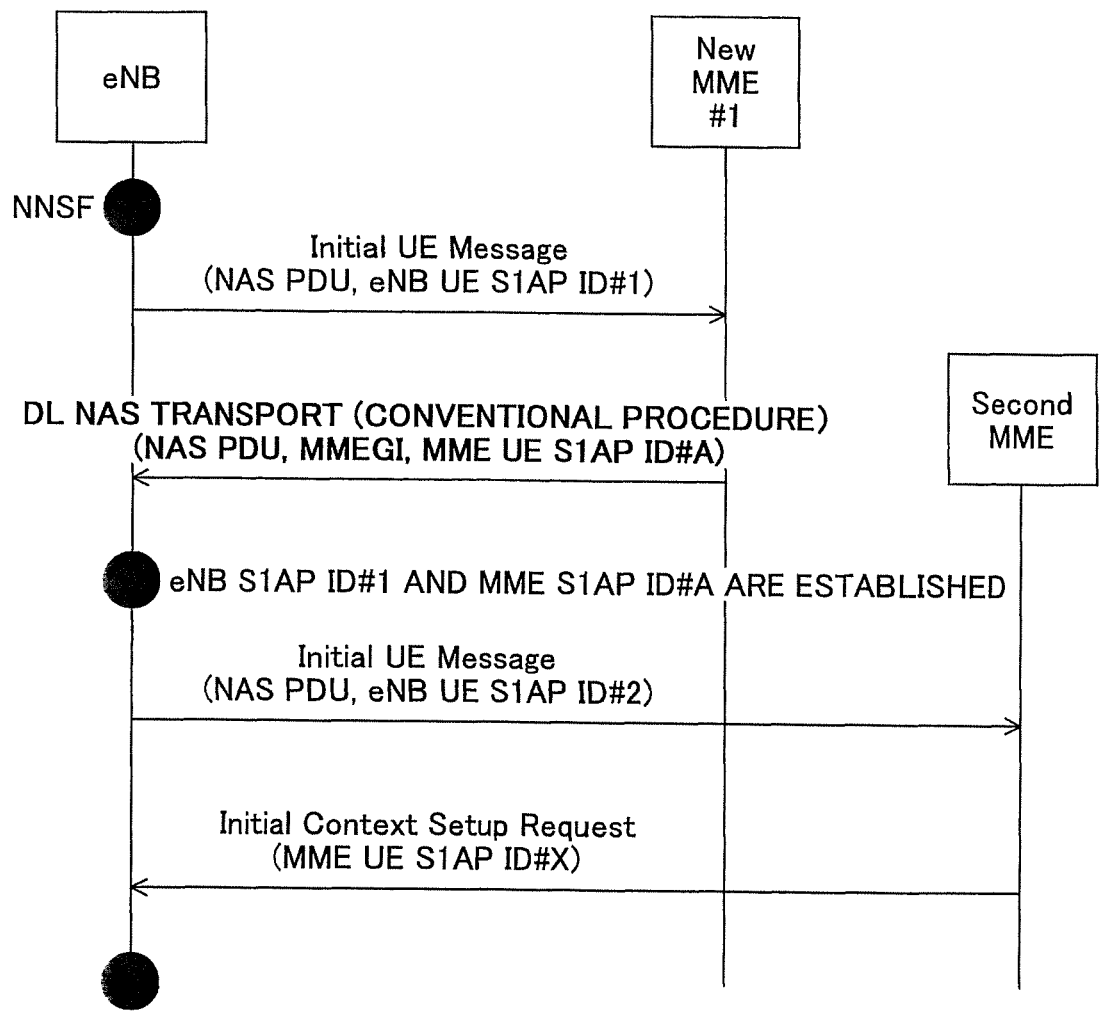
FIG. 4 is a detailed sequence diagram for illustrating the DECOR applied NNSF procedure.

Here, in the case where the procedure for rerouting the NAS message incoming from the MME #1 to the M2M MME is performed in the DL NAS TRANSPORT, an S1AP ID for uniquely identifying the user equipment in an S1 interface (I/F) is unnecessarily assigned. Specifically, as illustrated in FIG. 4, the MME UE S1AP ID is essentially set in the DL NAS TRANSPORT, and accordingly the MME will set the MME UE S1AP IE. As a result, at this timing, a pair of the eNB UE S1AP ID (eNB UE S1AP ID #1 in the illustrated example) for identifying the user equipment at the base station and the MME UE S1AP ID (MME UE S1AP ID # A in the illustrated example) is established. On the other hand, although the base station transmits an Initial UE Message to the reroute destination M2M MME at the next timing, the base station must reassign another eNB UE S1AP ID (eNB UE S1AP ID #2 in the illustrated example)

at that timing. In other words, the pair of the eNB UE S1AP ID #1 and the MME UE S1AP ID # A is deleted without substantial use, and an S1 Connection will be established with the pair of the eNB UE S1AP ID #2 and the MME UE S1AP ID # X.

In one or more embodiments, a base station (eNB) and a management apparatus (MME) to connect user equipment to a core network in the DECOR are disclosed. When the management apparatus to accommodate the user equipment is rerouted in the DECOR, the reroute source management apparatus indicates the reroute to the base station without providing an identifier (MME UE S1AP ID) for identifying the UE. As a result, in contrast to the conventional DL NAS TRANSPORT procedure, the base station does not have to reconfigure an identifier (eNB UE S1AP ID) corresponding to the UE identifier (MME UE S1AP ID) assigned by the reroute source management apparatus and can reuse the already configured identifier (eNB UE S1AP ID) for the reroute source management apparatus to establish connection (S1 Connection) to the reroute destination management apparatus.

A radio communication system according to one or more embodiments is described with reference to FIG. 5. Specifically, FIG. 5 is a schematic diagram for illustrating a radio communication system.

Figure 5:
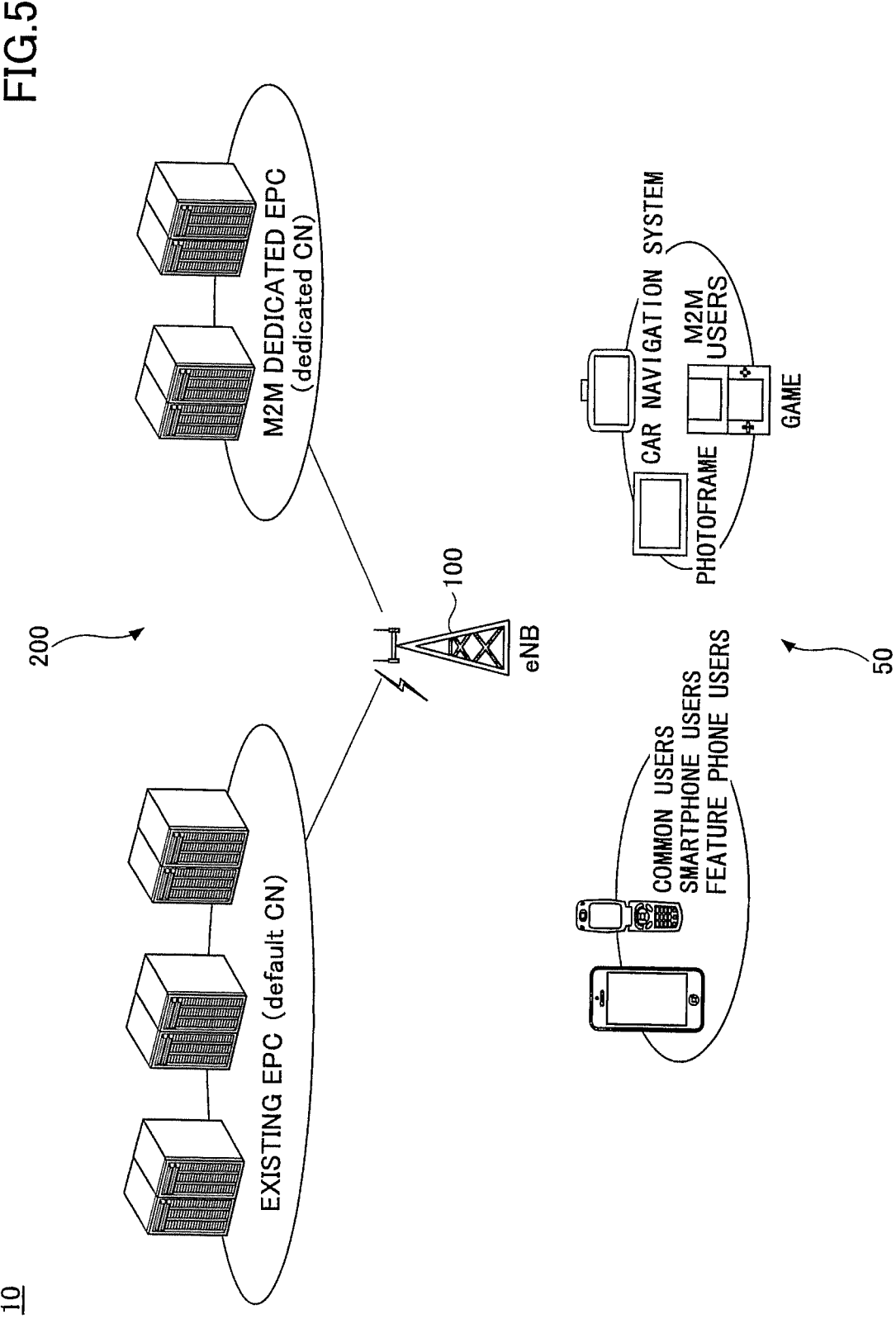
FIG. 5 is a schematic diagram for illustrating a radio communication system according to one or more embodiments.

As illustrated in FIG. 5, the radio communication system 10 has user equipment 50, a base station (eNB) 100 and a management apparatus (EPC) 200. For example, the radio communication system 10 may be an LTE system or an LTE-Advanced system. In one or more embodiments, only the single base station 100 is illustrated, but a large number of base stations 100 are disposed to cover a service area of the radio communication system 10.

The user equipment 50 communicates with the base station 100 via a cell served by the base station 100. Typically, the user equipment 50 may be any appropriate information processing apparatus having a radio communication function such as a smartphone, a cellular phone, a tablet, a mobile router, a wearable terminal, a smart meter, a sensor, a photo frame, a car navigation system and a gaming device. In one or more embodiments, the user equipment 50 is classified into a general user such as a cellular phone and a smartphone and an M2M user such as a smart meter and a sensor. In general, communication by the general user is prioritized over communication by the M2M user.

The base station 100 wirelessly connects to the user equipment 50 to transmit a downlink (DL) packet received from various network devices via the management apparatus 200 and an uplink (UL) packet received from the user equipment 50 to the network devices. In one or more embodiments, upon receiving a connection request from the user equipment 50, the base station 100 performs a core node selection function (NNSF) to select the management apparatus 200 to accommodate the user equipment 50 based on the received connection request and transmits an Initial UE Message including the eNB UE S1AP ID to the selected management apparatus 200.

The base station 100 is typically arranged with hardware resources such as an antenna for transmitting and receiving radio signals to/from the user equipment 50, a communication interface (e.g., X2 interface or the like) for communicating with adjacent base stations 100, a communication interface (e.g., S1 interface or the like) for communicating with the management apparatus 200 and a processor and/or a circuit for processing signals transmitted and received to/from the user equipment 50 and the management apparatus 200. Functions and operations of the base station 100 as stated below may be implemented by the processor processing or executing data and/or programs stored in a memory device. However, the base station 100 is not limited to the above-stated hardware arrangement and may have any other appropriate hardware arrangement.

The management apparatus 200 composes a core network including an EPC and an MME. In one or more embodiments, the base station 100 and the management apparatus 200 support the DECOR. Specifically, the management apparatus 200 determines the type of the user equipment 50 in response to a connection request such as an Attach/TAU and a Service Request of the user equipment 50 received from the base station 100. Depending on the determination, the general user is accommodated in the default management apparatus 200, and the M2M user is accommodated in the M2M dedicated management apparatus 200. The management apparatus 200 is typically implemented with a server or the like, and functions and operations of the management apparatus 200 as stated below may be implemented by the processor processing or executing data and/or programs stored in the memory device. However, the management apparatus 200 is not limited to the above-stated hardware arrangement and may have any other appropriate hardware arrangement.

Next, some operations to connect the user equipment to the core network in the DECOR according to one or more embodiments disclosed herein are described with reference to FIGS. 6-8. Specifically, FIG. 6 is a sequence diagram for illustrating the DECOR applied NNSF procedure.

Figure 6:
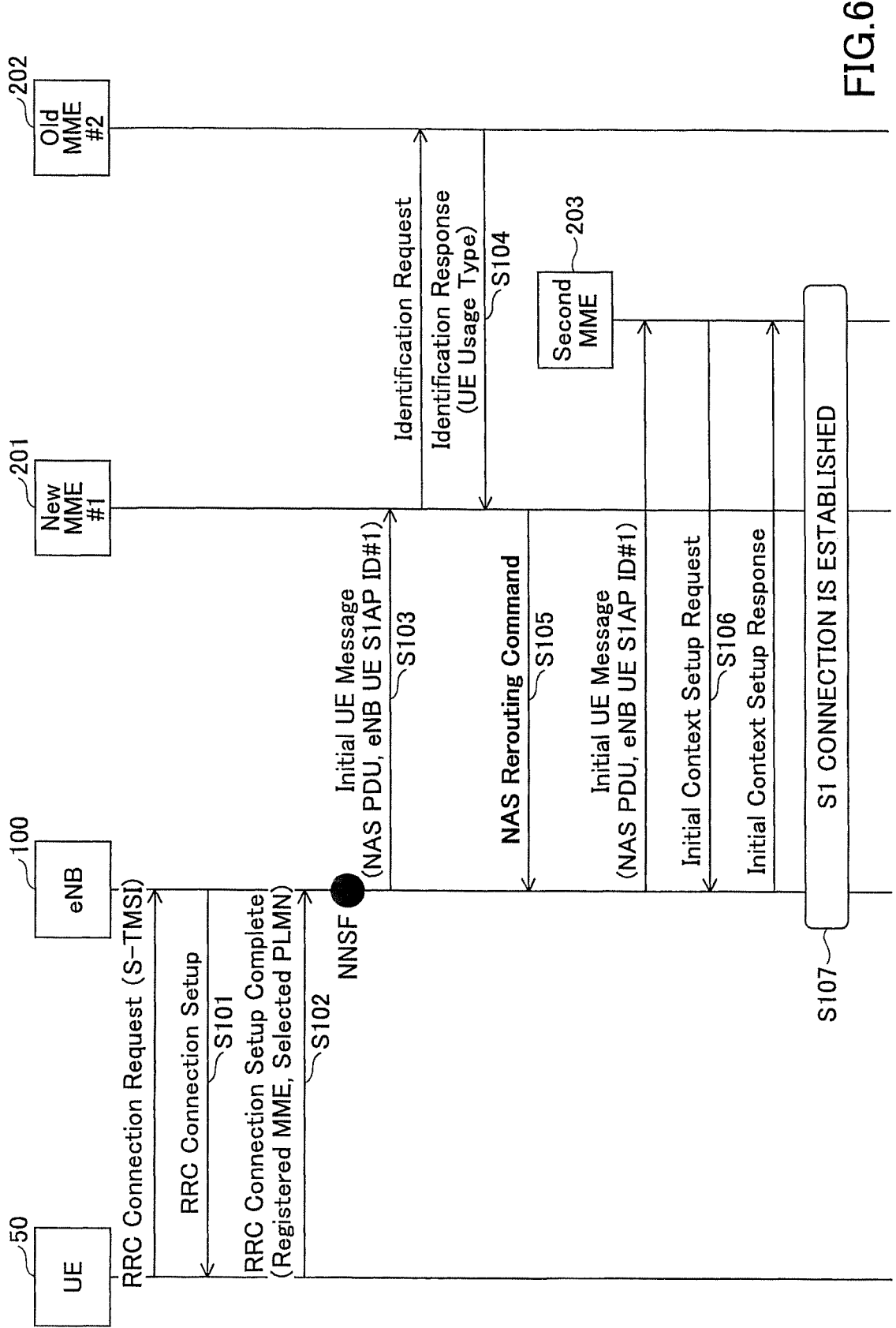
FIG. 6 is a sequence diagram for illustrating the DECOR applied NNSF procedure according to one or more embodiments.

As illustrated in FIG. 6, when the user equipment 50 transmits an RRC Connection Request to the base station 100 at step S101, a connection operation is performed between the user equipment 50 and the base station 100 via exchanges of an RRC Connection Setup and an RRC Connection Setup Complete.

At step S102, the base station 100 performs an NNSF based on an S-TMSI included in the RRC Connection Request or a Registered MME and a Selected PLMN included in the RRC Connection Setup Complete to determine a management apparatus 201 (New MME #1) to accommodate the user equipment 50.

At step S103, the base station 100 transmits an Initial UE Message including an eNB UE S1AP ID to the management apparatus 201.

At step S104, the management apparatus 201 identifies the user equipment 50 based on the received Initial UE Message. In the illustrated example, the management apparatus 201 identifies that the user equipment 50 has been accommodated in a management apparatus 202 (Old MME #2) in a previous session and transmits an Identification Request to the management apparatus 202. Upon receiving the Identification Request, the management apparatus 202 returns an Identification Response including an UE Usage Type indicative of a type of the user equipment 50 to the management apparatus 201.

At step S105, the management apparatus 201 identifies the type of the user equipment 50 to apply the DECOR and determines the management apparatus 200 to accommodate the user equipment 50 corresponding to the identified type. In the illustrated example, it is determined that the user equipment 50 is an M2M user, and the management apparatus 201 selects a management apparatus 203 (Second MME) as the management apparatus 200 to accommodate the user equipment 50 and transmits an NAS Rerouting Command to the base station 100 to redirect the connection request to the management apparatus 203. In the conventional procedure illustrated in FIG. 4, DL NAS TRANSPORT is performed, and the eNB UE S1AP ID is reconfigured corresponding to the MME UE S1AP ID provided in the DL NAS TRANSPORT. In one or more embodiments, however, the management apparatus 201 uses the eNB UE SLAP ID included in the Initial UE Message received at step S104 to transmit the NAS Rerouting Command to the base station 100 without providing the MME UE S1AP ID. As a result, the base station 100 does not have to configure any new eNB UE S1AP ID corresponding to the MME UE S1AP ID.

Figure 7:
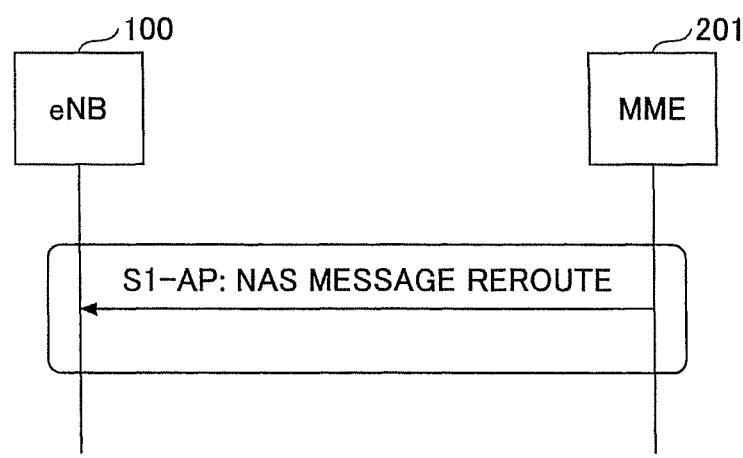
FIG. 7 is a sequence diagram for illustrating a procedure for rerouting an NAS PDU according to one or more embodiments.

Specifically, as illustrated in FIG. 7, the management apparatus 201 transmits a reroute message (NAS MESSAGE REROUTE) to the base station 100 to indicate a reroute from the management apparatus 201 to the management apparatus 203 including the NAS information to connect to the management apparatus 203 without providing an identifier (MME S1AP ID) of the user equipment 50.

At step S106, upon receiving the reroute message, the base station 100 transmits the Initial UE Message including the already configured eNB UE S1AP ID to the management apparatus 203 without configuring any new eNB UE S1AP ID to exchange an Initial Context Setup Request and an Initial Context Setup Response.

At step S107, an S1 Connection is established between the base station 100 and the management apparatus 203, and the eNB UE S1AP ID configured at step S104 will be associated with the MME UE S1AP ID provided by the management apparatus 203.

As stated above, the NAS MESSAGE REROUTE is transmitted by the management apparatus 201 and is used to indicate to the base station 100 that the NAS information has to be rerouted to the management apparatus 203. The NAS MESSAGE REROUTE may essentially include information elements (IEs) of Message Type, eNB UE S1AP ID and MME GI NAS-PDU as illustrated in FIG. 8, but the MME GI for identifying the management apparatus 201 may be configured to be ignored. In other examples, in addition to the essential IEs of Message Type, eNB UE S1AP ID, MME GI and NAS-PDU as illustrated in FIG. 8, the NAS MESSAGE REROUTE may include an MME UE S1AP ID as an arbitrary information element (IE), but the MME UE S1AP ID and the MME GI for identifying the management apparatus 201 may be analogously configured to be ignored.

Figure 9:
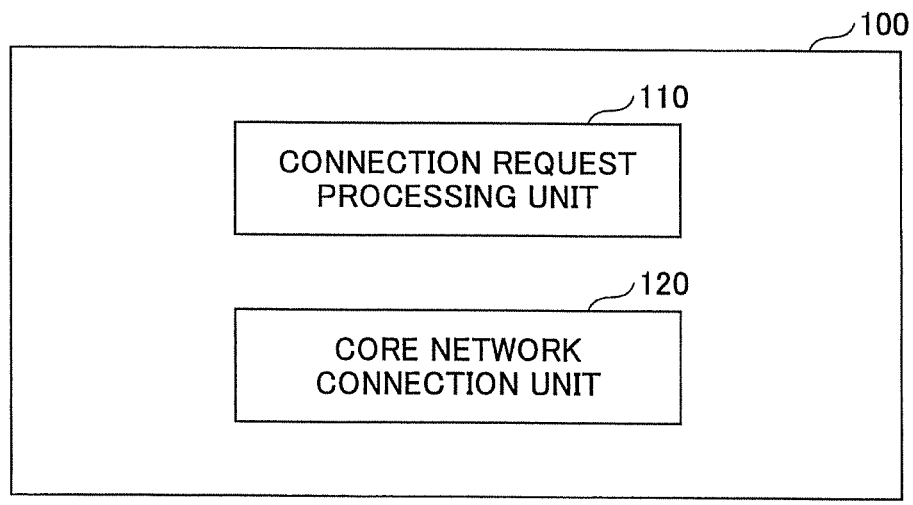
FIG. 9 is a block diagram for illustrating an arrangement of a base station according to one or more embodiments.

Next, the base station according to one or more embodiments disclosed herein is described with reference to FIG. 9. FIG. 9 is a block diagram for illustrating an arrangement of the base station.

As illustrated in FIG. 9, the base station 100 has a connection request processing unit 110 and a core network connection unit 120.

Upon receiving a connection request from the user equipment 50, the connection request processing unit 110 performs a connection operation on the user equipment 50. Specifically, the connection request processing unit 110 exchanges an RRC Connection Request, an RRC Connection Setup, and an RRC Connection Setup Complete with the user equipment 50.

Upon receiving a reroute message to indicate a reroute from the management apparatus 201 to the management apparatus 203, the core network connection unit 120 transmits NAS information in the reroute message to the management apparatus 203 without establishing an S1 connection for the management apparatus 201 and the user equipment 50. Specifically, since an identifier of the user equipment 50 in the S1 Connection by the management apparatus 201 (MME UE S1AP ID) is not provided in the NAS MESSAGE REROUTE received from the management apparatus 201 or is indicated to be ignored, the core network connection unit 120 does not have to configure the eNB UE S1AP ID corresponding to the MME UE S1AP ID. Accordingly, the core network connection unit 120 can reuse the eNB UE S1AP ID configured at transmitting the Initial UE Message to the management apparatus 201 to transmit the Initial UE Message including the eNB UE S1AP ID to the management apparatus 203.

In one or more embodiments, the management apparatus 201 may have a default MME in the DECOR, and the management apparatus 203 may have an M2M dedicated MME in the DECOR. The reroute message may instruct the base station 100 to reroute the user equipment 50 from the default MME to the M2M dedicated MME. In contrast to the conventional DL NAS TRANSPORT, the identifier of the user equipment 50 assigned by the management apparatus 201 (MME UE S1AP ID) is not provided or is configured to be ignored in the reroute message. Accordingly, the core network connection unit 120 does not have to reconfigure the identifier of the user equipment 50 by the base station 100 (eNB UE S1AP ID) corresponding to the identifier of the user equipment 50 by the management apparatus 201.

In one or more embodiments, the core network connection unit 120 may establish the S1 connection for the management apparatus 203 and the user equipment 50 in association of an identifier of the user equipment 50 by the base station 100 transmitting to the management apparatus 201 with an identifier of the user equipment 50 by the management apparatus 203. As stated above, the core network connection unit 120 may not reconfigure the identifier of the user equipment 50 by the base station 100 (eNB UE S1AP ID) corresponding to the identifier of the user equipment 50 by the management apparatus 201 (MME UE S1AP ID). Accordingly, the core network connection unit 120 can reuse the identifier assigned by the base station 100 (eNB UE S1AP ID) at transmitting an Initial UE Message to the management apparatus 201 to transmit the Initial UE Message including the identifier to the reroute destination management apparatus 203 and establish the S1 Connection with a pair of the identifier and the identifier of the user equipment 50 assigned by the management apparatus 203 (MME UE S1AP ID).

In one or more embodiments, the core network connection unit 120 may perform a core node selection function to select the management apparatus 201 as a management apparatus to accommodate the user equipment 50 based on the connection request received from the user equipment 50. For example, if the user equipment 50 is attempting connection by an Initial Attach, the core network connection unit 120 may use a GUMMEI or a Selected PLMN in an RRC Connection Setup Complete to select the management apparatus 201. Alternatively, if the user equipment 50 is attempting connection by a Service Request or a TAU, the core network connection unit 120 may use an S-TMSI in an RRC Connection Request to select the management apparatus 201.

Figure 10:
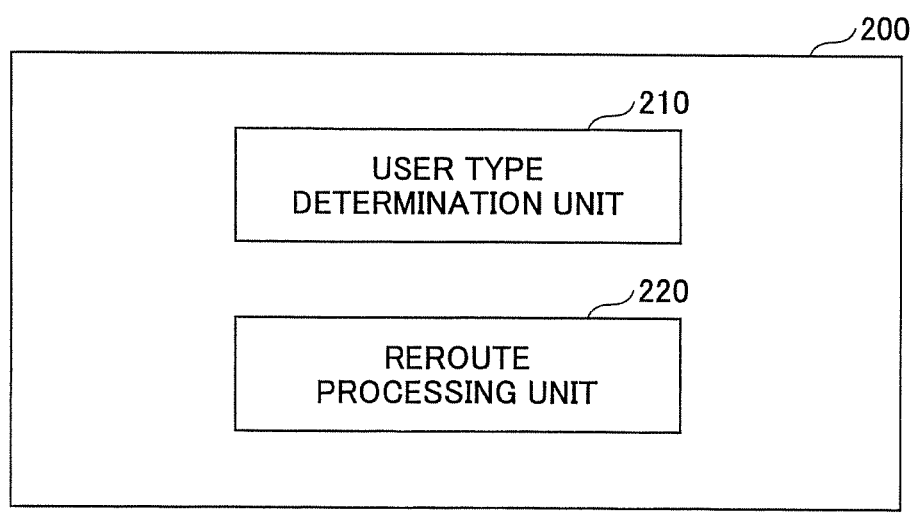
FIG. 10 is a block diagram for illustrating an arrangement of a management apparatus according to one or more embodiments.

Next, the management apparatus according to one or more embodiments disclosed herein is described with reference to FIG. 10. FIG. 10 is a block diagram for illustrating an arrangement of the management apparatus.

As illustrated in FIG. 10, the management apparatus 200 serves as the reroute source management apparatus 201 in the above-stated example and has a user type determination unit 210 and a reroute processing unit 220.

Upon receiving a connection request of the user equipment 50 from the base station 100, the user type determination unit 210 determines a type of the user equipment 50. Specifically, if the user equipment 50 is connecting by an Initial Attach, the user type determination unit 210 may obtain subscription information of the user equipment 50 from an upper station (IPSCP/HSS or the like) and determine the type (UE Usage Type) of the user equipment 50. Alternatively, if the user equipment 50 is connecting by a Service Request or a TAU, the user type determination unit 210 may obtain the type (i.e., the UE Usage Type) of the user equipment 50 from the management apparatus 202 that has accommodated the user equipment 50 in a previous session.

The reroute processing unit 220 performs a reroute operation to accommodate the user equipment 50 in another management apparatus 203 corresponding to the type of the user equipment 50 and transmits a reroute message, including NAS information to connect to the management apparatus 203, to the base station 100 without providing an identifier of the user equipment 50 by the management apparatus 201. Specifically, if the user equipment 50 is an M2M user, the reroute processing unit 220 transmits NAS MESSAGE REROUTE to the base station 100 to indicate a reroute from the default management apparatus 201 to the M2M dedicated management apparatus 203 without providing an identifier of the user equipment 50 by the management apparatus 201 (MME UE S1AP ID). According to one or more embodiments, in contrast to the conventional DL NAS TRANSPORT, the identifier of the user equipment 50 assigned by the management apparatus 201 (MME UE S1AP ID) is not provided or is configured to be ignored in the NAS MESSAGE REROUTE. Accordingly, in response to reception of the NAS MESSAGE REROUTE, the base station 100 does not have to reconfigure the identifier of the user equipment 50 by the base station 100 (eNB UE S1AP ID) corresponding to the identifier of the user equipment 50 by the management apparatus 201 (MME UE S1AP ID) and can reuse the identifier already configured by the base station (eNB UE S1AP ID) for the management apparatus 203.

In one or more embodiments, the management apparatus 201 may have a default MME in the DECOR, and the other management apparatus 203 may have an M2M dedicated MME in the DECOR. The reroute message may instruct the base station 100 to reroute the user equipment 50 from the default MME to the M2M dedicated MME. In contrast to the conventional DL NAS TRANSPORT, the identifier of the user equipment 50 by the management apparatus 201 (MME UE S1AP ID) is not provided or is configured to be ignored in the reroute message. Accordingly, the base station 100 does not have to reconfigure the identifier of the user equipment 50 assigned by the base station 100 (eNB UE S1AP ID) corresponding to the identifier of the user equipment 50 assigned by the management apparatus 201.

Figure 11:
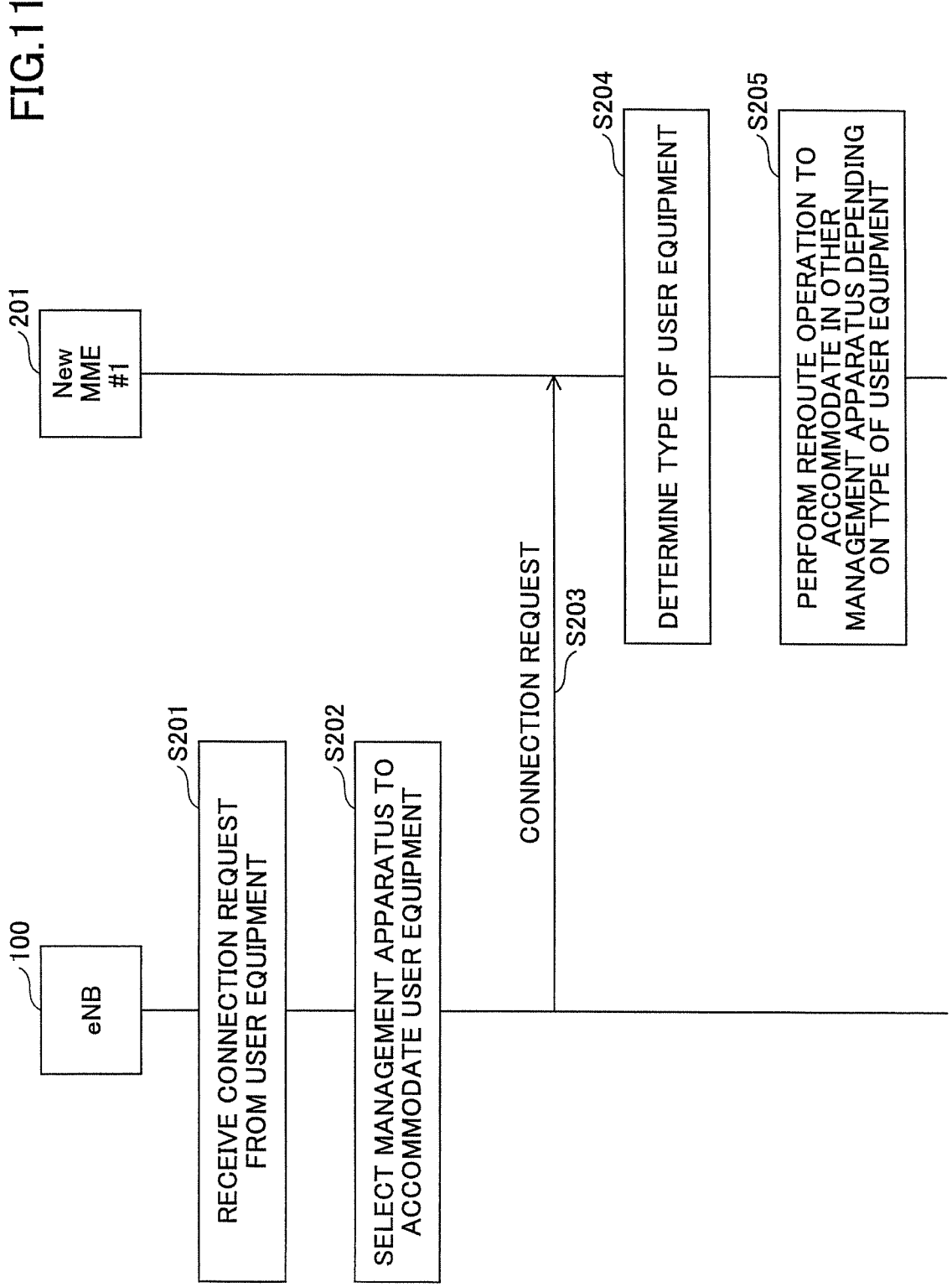
FIG. 11 is a sequence diagram for illustrating a connection operation according to one or more embodiments.

Next, some connection operations to connect the user equipment 50 to a core network according to one or more embodiments disclosed herein are described with reference to FIG. 11. Specifically, FIG. 11 is a sequence diagram for illustrating a connection operation.

At step S201, the base station 100 receives a connection request from the user equipment 50. Specifically, the base station 100 receives an RRC Connection Request and an RRC Connection Setup Complete.

At step S202, the base station 100 selects the management apparatus 200 to accommodate the user equipment 50 based on the received connection request. Specifically, the base station 100 performs an NNSF to determine the management apparatus 201 to accommodate the user equipment 50 based on the received connection request.

At step S203, the base station 100 transmits the connection request for the user equipment 50 to the selected management apparatus 201. Specifically, the base station 100 transmits an Initial UE Message including eNB UE S1AP ID to the management apparatus 201.

At step S204, the management apparatus 201 determines the type of the user equipment 50. For example, if the user equipment 50 is connecting by an Initial Attach, the management apparatus 201 may obtain subscription information of the user equipment 50 from an upper station (IPSCP/HSS or the like) and determine the type (UE Usage Type) of the user equipment 50. Alternatively, if the user equipment 50 is connecting by a Service Request or a TAU, the management apparatus 201 may obtain the type (UE Usage Type) of the user equipment 50 from the management apparatus 202 that has accommodated the user equipment 50 in a previous session.

At step S205, the management apparatus 201 performs a reroute operation to accommodate the user equipment 50 in another management apparatus 203 corresponding to the type of the user equipment 50. Here, the management apparatus 201 transmits a reroute message, including NAS information to connect to the management apparatus 203, to the base station 100 without providing the identifier of the user equipment 50 by the management apparatus 201 (MME UE S1AP ID). Specifically, if the user equipment 50 is an M2M user, the management apparatus 201 transmits NAS MESSAGE REROUTE to the base station 100 to indicate a reroute from the management apparatus 201 to the M2M dedicated management apparatus 203 without providing the identifier of the user equipment 50 by the management apparatus 201 (MME UE S1AP ID). Upon receiving the NAS MESSAGE REROUTE, the base station 100 can transmit an Initial UE Message, including the identifier of the user equipment 50 already configured by the base station (eNB UE S1AP ID), to the management apparatus 203 and establish an S1 Connection to the management apparatus 203 by the reused identifier (eNB UE S1AP ID).

Here, the block diagrams for use in the above description of one or more embodiments show blocks for functional units. These functional blocks (components) are implemented in any combination of hardware and/or software items. Also, the implementations of the respective functional blocks are not particularly limited. In other words, the respective functional blocks may be implemented in a physically and/or logically coupled single device or in multiple devices where two or more physically and/or logically separated devices are connected directly and/or indirectly (for example, in wired and/or wireless manners).

Figure 12:
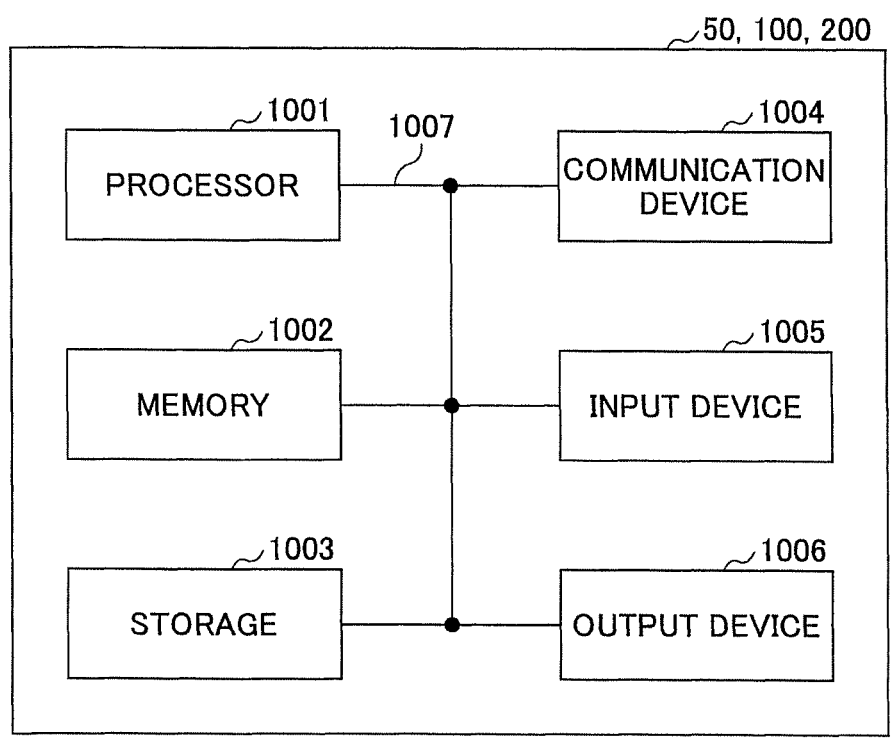
FIG. 12 is a block diagram for illustrating a hardware arrangement of the user equipment, the base station and the management apparatus according to one or more embodiments.

For example, the user equipment 50, the base station 100 and the management apparatus 200 according to one or more embodiments may function as a computer processing the radio communication method. FIG. 12 is a block diagram for illustrating a hardware arrangement of the user equipment 50, the base station 100 and the management apparatus 200 according to one or more embodiments disclosed herein. The user equipment 50, the base station 100 and the management apparatus 200 as stated above may each be physically arranged as a computer device including a processor 1001, a memory 1002, a storage 1003, a communication device 1004, an input device 1005, an output device 1006, a bus 1007 or the like.

Note that the language "apparatus" can be interchangeably read as a circuit, a device, a unit or the like. The hardware arrangement of the user equipment 50, the base station 100 and the management apparatus 200 may each be arranged to include one or more of the illustrated devices or without including a part of the devices.

Respective functions in the user equipment 50, the base station 100 and the management apparatus 200 are implemented by loading a predetermined software item (program) into hardware items such as the processor 1001 and the memory 1002 to cause the processor 1001 to execute operations, perform communication with the communication device 1004 and control read and/or write operations on data from/in the memory 1002 and the storage 1003.

The processor 1001 runs an operating system to control the whole computer, for example. The processor 1001 may be arranged with a central processing unit (CPU) including an interface with a peripheral device, a control device, a calculation device, a register and the like. For example, the above-stated components may be implemented in the processor 1001.

Also, the processor 1001 loads programs (program codes), software modules and data from the storage 1003 and/or the communication device 104 into the memory 1002 and executes various operations in accordance with them. As the programs, programs for causing the computer to perform at least a part of operations as described in the above embodiments are used. For example, operations by the components in the user equipment 50, the base station 100 and the management apparatus 200 may be implemented with control programs stored in the memory 1002 and executed by the processor 1001, and other functional blocks may be similarly implemented. It has been described that the above-stated various operations are performed by the single processor 1001, but they may be performed with two or more processors 1001 simultaneously or sequentially. The processor 1001 may be implemented with one or more chips. Note that the programs may be transmitted from a network via an electric communication line.

The memory 1002 is a computer-readable storage medium and may be arranged with at least one of a Read Only Memory (ROM), an Erasable Programmable ROM (EPROM), an Electrically Erasable Programmable ROM (EEPROM), a Random Access Memory (RAM) or the like, for example. The memory 1002 may be referred to as a register, a cache, a main memory (e.g., a main storage device) or the like. The memory 1002 can store programs (e.g., program codes), software modules or the like that can be executed to implement the radio communication method according to one or more embodiments disclosed herein.

The storage 1003 is a computer-readable storage medium and may be arranged with at least one of an optical disk such as a Compact Disc ROM (CD-ROM), a hard disk drive, a flexible disk, a magnetic optical disk (e.g., a compact disk, a digital versatile disk, a Blu-ray (registered trademark) disk), a smart card, a flash memory (e.g., a card, a stick, a key drive), a floppy (registered trademark), a magnetic strip or the like. The storage 1003 may be referred to as an auxiliary storage device. The above-stated storage medium may be a database or a server including the memory 1002 and/or the storage 1003 or any other appropriate medium.

The communication device 1004 is a hardware item (e.g., a transceiver device) for communication over computers via a wired and/or wireless network and may be also referred to as a network device, a network controller, a network card, a communication module or the like. For example, the above-stated components may be implemented in the communication device 1004.

The input device 1005 is an input device for receiving external inputs (e.g., a keyboard, a mouse, a microphone, a switch, a button, a sensor or the like). The output device 1006 is an output device for providing external outputs (e.g., a display, a speaker, a LED ramp or the like). Note that the input device 1005 and the output device 1006 may be integrally arranged (e.g., a touch panel).

Also, the respective devices such as the processor 1001 and the memory 1002 are connected with each other via the bus 1007 for communicating information. The bus 1007 may be arranged with a single bus or different buses for different devices.

Also, the user equipment 50, the base station 100 and the management apparatus 200 may be arranged to include a hardware item such as a macro processor, a digital signal processor (DSP), an Application Specific Integrated Circuit (ASIC), a Programmable Logic Device (PLD), a Field Programmable Gate Array (FPGA) or the like, and a part or all of the functional blocks may be implemented in the hardware item. For example, the processor 1001 may be implemented with at least one of these hardware items.

Transmission of information is not limited to the embodiments/implementations described herein and may be made in any other manner. For example, information may be transmitted in physical layer signaling (for example, Downlink Control Information (DCI) and Uplink Control Information (UCI)), upper layer signaling (e.g., radio Resource Control (RRC) signaling, medium Access Control (MAC) signaling, broadcast information (master Information Block (MIB) and System Information Block (SIB)) or any other signal or combinations thereof. Also, the RRC signaling may be referred to as an RRC message and may be an RRC Connection Setup message, an RRC Connection Reconfiguration message or the like.

The respective embodiments/implementations disclosed herein may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA 2000, Ultra Mobile Broadband (UMB), IEEE 802.11 (Wi-Fi), IEEE 802.16 (WiMAX), IEEE 802.20, UWB (Ultra-WideBand), Bluetooth (registered trademark) or any other appropriate system or next-generation systems enhanced based on them.

Procedures, sequences, flowcharts or the like of the respective embodiments/implementations disclosed herein may be permutable, as long as there is not inconsistency. For example, for methods as described in the present specification, various steps are presented in an exemplary order, and the embodiments disclosed herein not limited to the presented certain order.

Certain operations performed by the base station 100 as described in the present specification may be performed by its upper node in some cases. In a network including one or more network nodes having base stations, various operations performed to communicate with terminals may be apparently performed by the base stations and/or network nodes other than the base stations (e.g., a MME or an S-SW can be assumed, but the network nodes are not limited to them). Although it has been described that the single network node other than the base stations is used in the above example, combinations of multiple other network nodes (e.g., a MME and an S-GW) may be used.

Information and others may be output from an upper layer to a lower layer, or vice versa. They may be input and output via multiple network nodes.

Incoming and outgoing information and others may be stored in a certain location (e.g., a memory) and/or managed in a management table. The incoming and outgoing information and others may be overwritten, updated or added.

The outgoing information and others may be deleted. The incoming information and others may be transmitted to other device.

Determination may be made with a one-bit value (e.g., 0 or 1), a Boolean value (e.g., true or false) or numerical comparison (for example, comparison with a predetermined value).

The embodiments/implementations disclosed herein may be used singularly or in combinations or switched in connection with execution. Also, indication of predetermined information (e.g., indication "it is X") is not limited to explicit manners and may be performed implicitly (e.g., the predetermined information is not indicated).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function or the like regardless of the software being referred to as software, a firmware, a middleware, a microcode, a hardware descriptive language or other names.

Also, the software, the instruction or the like may be transmitted and received via a transmission medium. For example, if the software is transmitted from a website, a server or other remote sources by using wired techniques such as a coaxial cable, an optical fiber cable, a twist pair and a digital subscriber line (DSL) and/or wireless techniques such as infrared, radio frequency and microwave, these wired techniques and/or wireless techniques are included within definition of a transmission medium.

Information, signals or the like as described in the present specification may be represented with use of any of various different techniques. For example, data, an instruction, a command, information, a signal, a bit, a symbol, a chip and so on referred to throughout the above description may be represented with a voltage, a current, an electromagnetic wave, a magnetic field, a magnetic particle, an optical field, a photon or any combination thereof.

Note that terminologies described in the present specification and/or terminologies required to understand the present specification may be replaced with terminologies having the same or similar meanings. For example, a channel and/or a symbol may be a signal. Also, the signal may be a message. Also, a component carrier (CC) may be referred to as a carrier frequency, a cell or the like.

The terminologies "system" and "network" for use in the present specification are interchangeably used.

Also, information, a parameter and so on as described in the present specification may be represented with an absolute value, a relative value from a predetermined value or other corresponding information. For example, a radio resource may be specified with an index.

Names as used for the above-stated parameters are not restrictive from any standpoint. Furthermore, there are some cases where formulae and so on using these parameters may be different from ones as explicitly disclosed in the present specification. Various channels (e.g., a PUCCH, a PDCCH or the like) and information elements (e.g., a TPC or the like) can be identified with any names, and the various names assigned to these various channels and information elements are not restrictive from any standpoint.

A base station can accommodate one or more (e.g., three in one or more embodiments) cells (i.e., sectors). If the base station accommodates multiple cells, the whole coverage area of the base station can be segmented into multiple smaller areas, and the respective smaller areas can provide communication services with a base station subsystem (e.g., indoor small base station RRH: Remote Radio Head). The terminology "cell" or "sector" indicates a part or whole of the coverage area of the base station providing communication services in the coverage and/or the base station subsystem. Furthermore, the terminologies "base station", "eNB", "cell" and "sector" can be interchangeably used in the present specification. The base station may be referred to as terminologies such as a fixed station, a NodeB, an eNodeB (eNB), an access point, a femtocell and a small cell.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

There are some cases where terminologies "determining" as used in the present specification may include various operations. The "determining" may include calculating, computing, processing, deriving, investigating, looking up (e.g., looking up a table, a database or other data structures) and ascertaining, for example. Also, the "determining" may include receiving (e.g., receiving information), transmitting (e.g., transmitting information), inputting, outputting and accessing (e.g., accessing data in a memory). Also, the "determining" may include resolving, selecting, choosing, establishing, comparing or the like. In other words, the "determining" may include any operation.

The terminologies "connected", "coupled" or all variations thereof mean direct or indirect connection or coupling between two or more elements and can include existence of one or more intermediate elements between two mutually "connected" or "coupled" elements. The coupling or connection between elements may be physical, logical or in combinations thereof. If they are used in the present specification, it can be considered that two elements are mutually "connected" or "coupled" with use of one or more electric wires, cables and/or print electric connections and as several non-limiting and non-comprehensive examples, with use of electromagnetic energy such as electromagnetic energy having a wavelength of a radio frequency domain, a microwave domain and an optical (i.e., both visible and invisible) domain.

A reference signal can be omitted as a Reference Signal (RS) and may be referred to as a pilot depending on applied standards.

The recitation "based on" as used in the present specification does not mean "only based on", unless specifically stated otherwise. In other words, the recitation "based on" means both "only based on" and "at least based on".

Any reference to elements with use of terminologies such as "first", "second" and so on as used in the present specification does not limit the amount or order of these elements in general. These terminologies can be used in the present specification as convenient manners for distinguishing between two or more elements. Accordingly, the reference to the first and second elements does not mean that only the two elements are used there or the first element has to precede the second element in any fashion.

The terminology "means" in an arrangement of each apparatus as stated above may be replaced with "unit", "circuit", "device" or the like.

As long as the terminologies "including", "comprising" and variations thereof are used in the present specification or claims, these terminologies are intended to be inclusive similar to the terminology "comprising". Furthermore, the terminology "or" as used in the present specification or claims is intended not to be an exclusive OR.

A radio frame may be arranged with one or more frames in a time domain. In the time domain, one or more frames each may be referred to as a subframe. The subframe may be further arranged with one or more slots in the time domain. The slot may be further arranged with one or more symbols (e.g., OFDM symbols, SC-FDMA symbols and so on) in the time domain. Any of the radio frame, the subframe, the slot and the symbol represents a time unit for transmitting signals. The radio frame, the subframe, the slot and the symbol may be referred to in other corresponding manners. For example, in LTE systems, a base station performs scheduling to assign radio resources (e.g., frequency bandwidths, transmission power and so on available in the mobile station) to mobile stations. The minimum time unit for scheduling may be referred to as a Transmission Time Interval (TTI). For example, one subframe, multiple successive subframes or one slot may be referred to as the TTI. A resource block (RB) may be a resource assignment unit in the time domain and the frequency domain and may include one or more successive subcarriers in the frequency domain. Also, in the time domain, the resource block may include one or more symbols and have one slot, one subframe or one TTI in length. The single TTI and subframe each may be arranged with one or more resource blocks. The above-stated arrangement of radio frame is merely exemplary, and the number of subframes in the radio frame, the number of slots in the subframe, the number of symbols and resource blocks in the slot and the number of subcarriers in the resource block can be changed in any manner.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A base station comprising:
a transceiver; and
a processor configured to:
   in response to receiving a connection request from a user equipment, cause the transceiver to transmit a message to a first management apparatus,
      wherein the message includes an identifier of the user equipment assigned by the base station, and
      wherein the base station is configured to perform a connection operation on the user equipment; and
   in response to receiving a reroute message to indicate a reroute from the first management apparatus to a second management apparatus, cause the transceiver to transmit Non Access Stratum (NAS) information in the reroute message to the second management apparatus,
   wherein the identifier of the user equipment assigned by the base station is configured in the reroute message without provision of an identifier of the user equipment assigned by the first management apparatus,
   wherein the reroute message includes instructions for the base station to reroute the user equipment from the first management apparatus to the second management apparatus, which is selected by the first management apparatus,
   wherein the first management apparatus has a default core network in a Dedicated Core Network (DECOR), and
   wherein the second management apparatus has a Machine-to-Machine (M2M) dedicated core network in the DECOR.

2. The base station according to claim 1, wherein the processor establishes an S1 connection for the second management apparatus and the user equipment based on the identifier of the user equipment assigned by the base station and an identifier of the user equipment assigned by the second management apparatus.

3. The base station according to claim 2, wherein:
the processor performs a core node selection function to select the first management apparatus as a management apparatus to accommodate the user equipment, and
the first management apparatus is selected based on the connection request received from the user equipment.

4. The base station according to claim 1, wherein:
the processor performs a core node selection function to select the first management apparatus as a management apparatus to accommodate the user equipment, and
the first management apparatus is selected based on the connection request received from the user equipment.

5. A management apparatus comprising:
a transceiver; and
a processor configured to:
   in response to receiving a connection request of a user equipment from a base station, determine a type of the user equipment;
   perform a reroute operation to accommodate the user equipment in another management apparatus corresponding to the type of the user equipment; and
   cause a transceiver to transmit a reroute message to the base station,
   wherein the reroute message includes Non Access Stratum (NAS) information for connecting to the other management apparatus,
   wherein an identifier of the user equipment assigned by the base station is configured in the reroute message without provision of an identifier of the user equipment assigned by the management apparatus,
   wherein the reroute message includes instructions for the base station to reroute the user equipment from the management apparatus to the other management apparatus, which is selected by the management apparatus,
   wherein the management apparatus has a default core network in a Dedicated Core Network (DECOR), and
   wherein the other management apparatus has a Machine-to-Machine (M2M) dedicated core network in the DECOR.

6. The management apparatus according to claim 5, wherein the identifier of the user equipment assigned by the management apparatus is not configured in the reroute message.

7. A connection method for connecting a user equipment to a core network, the method comprising:
receiving, by a base station, a connection request from the user equipment;
selecting, by the base station, a first management apparatus to accommodate the user equipment based on the received connection request;
transmitting, by the base station, the connection request for the user equipment to the first management apparatus;
determining, by the first management apparatus, a type of the user equipment; and performing, by the first management apparatus, a reroute operation to accommodate the user equipment in a second management apparatus, wherein the second management apparatus corresponds to the type of the user equipment, wherein performing the reroute operation includes transmitting a reroute message to the base station, wherein the reroute message includes Non Access Stratum (NAS) information for connecting to the second management apparatus, and wherein an identifier of the user equipment assigned by the base station is configured in the reroute message without provision of an identifier of the user equipment assigned by the first management apparatus, wherein the reroute message includes instructions for the base station to reroute the user equipment from the first management apparatus to the second management apparatus, which is selected by the first management apparatus, wherein the first management apparatus has a default core network in a Dedicated Core Network (DECOR), and wherein the second management apparatus has a Machine-to-Machine (M2M) dedicated core network in the DECOR.

* * * * *